US011987952B2

United States Patent
Yasuda et al.

(10) Patent No.: US 11,987,952 B2
(45) Date of Patent: May 21, 2024

(54) CONSTRUCTION MACHINE

(71) Applicant: Hitachi Construction Machinery Co., Ltd., Tokyo (JP)

(72) Inventors: Yutaka Yasuda, Tsuchiura (JP); Daisuke Kumata, Tsuchiura (JP); Ryouta Aikawa, Tsuchiura (JP)

(73) Assignee: Hitachi Construction Machinery Co., Ltd, Tokyo (JP)

( * ) Notice: Subject to any disclaimer, the term of this patent is extended or adjusted under 35 U.S.C. 154(b) by 472 days.

(21) Appl. No.: 17/420,835

(22) PCT Filed: Feb. 17, 2020

(86) PCT No.: PCT/JP2020/005961
§ 371 (c)(1),
(2) Date: Jul. 6, 2021

(87) PCT Pub. No.: WO2020/189126
PCT Pub. Date: Sep. 24, 2020

(65) Prior Publication Data
US 2022/0090355 A1    Mar. 24, 2022

(30) Foreign Application Priority Data

Mar. 20, 2019   (JP) ................................ 2019-053204

(51) Int. Cl.
*F16C 11/04*     (2006.01)
*E02F 9/00*      (2006.01)
*F16C 33/10*     (2006.01)

(52) U.S. Cl.
CPC ............ *E02F 9/006* (2013.01); *F16C 11/045* (2013.01); *F16C 33/10* (2013.01); *F16C 2350/26* (2013.01); *Y10T 403/32861* (2015.01)

(58) Field of Classification Search
CPC ................... E02F 9/006; F16C 11/045; Y10T 403/32861; Y10T 403/32918
See application file for complete search history.

(56) References Cited

U.S. PATENT DOCUMENTS 6,877,259 B2*   4/2005  Nishimura ............ F16C 11/045
                                                    403/324
8,333,528 B2*  12/2012  Oertley .................. F16J 15/344
                                                    403/150

(Continued)

FOREIGN PATENT DOCUMENTS

| CN | 101091067 A | 12/2007 |
|---|---|---|
| JP | 4-9453 U | 1/1992 |

(Continued)

OTHER PUBLICATIONS

Chinese-language Office Action issued in Chinese Application No. 202080011482.4 dated Apr. 29, 2022 with English translation (12 pages).

(Continued)

*Primary Examiner* — Michael P Ferguson
(74) *Attorney, Agent, or Firm* — Crowell & Moring LLP

(57) ABSTRACT

Provided is a construction machine in which a pair of boss parts (17L, 17R) coupled via a boss pipe (18) are welded to a tip end of an arm (7), a coupling pin (16) is rotatably supported in bushes (20L, 20R) of the respective boss parts (17L, 17R), and brackets (8b) of a bucket (8) are coupled to opposite ends of the coupling pin (16). An inner pipe (25) is fitted onto the coupling pin (16) on an inner circumferential side of the boss pipe (18), and defines a grease passage (26) between the coupling pin (16) and the inner pipe (25). Left and right gaps between the boss pipe (18) and the inner pipe (25) are closed with side plates (27L, 27R), and a pair of grease chambers (28L, 28R) communicating with each other via the grease passage (26) are defined. A grease supply pipe (Continued)

(29, 30) has a base end welded to a center of an outer circumferential surface of the inner pipe (25) in an axis (C) direction, and a tip end opened in a left side plate (7L) of the arm (7), so that a nipple (33) is mounted to the tip end.

3 Claims, 4 Drawing Sheets

(56) References Cited

U.S. PATENT DOCUMENTS

| | | | |
|---|---|---|---|
| 8,596,870 B2* | 12/2013 | Akita | F16J 15/166 384/140 |
| 2002/0081046 A1 | 6/2002 | Hamaguchi et al. | |
| 2005/0051975 A1 | 3/2005 | Takayama et al. | |
| 2008/0138005 A1 | 6/2008 | Aira et al. | |

FOREIGN PATENT DOCUMENTS

| | | |
|---|---|---|
| JP | 4-53852 U | 5/1992 |
| JP | 8-93770 A | 4/1996 |
| JP | 9-32844 A | 2/1997 |
| JP | 2530006 Y2 | 3/1997 |
| JP | 2002-188174 A | 7/2002 |
| JP | 2004-346417 A | 12/2004 |
| JP | 2007-9598 A | 1/2007 |

OTHER PUBLICATIONS

International Search Report (PCT/ISA/210) issued in PCT Application No. PCT/JP2020/005961 dated Apr. 21, 2020 with English translation (four (4) pages).
Japanese-language Written Opinion (PCT/ISA/237) issued in PCT Application No. PCT/JP2020/005961 dated Apr. 21, 2020 (three (3) pages).

* cited by examiner

CONSTRUCTION MACHINE

TECHNICAL FIELD

The present invention relates to a construction machine, and more particularly relates to a bearing structure that relatively rotatably couples a first structural body and a second structural body.

BACKGROUND ART

As this type of bearing structure of a construction machine, for example, Patent Document 1 discloses a bearing structure that rotatably couples a bucket to a tip end of an arm of a work front provided in a hydraulic excavator. In this bearing structure, as shown in FIG. 1 of Patent Document 1, a pair of boss parts coupled via a boss pipe are welded to the tip end of the arm, and a pin is rotatably supported in a bush provided in each boss part. Opposite ends of the pin protrude from an outer surface of each boss part, and are coupled to a pair of brackets of the bucket, respectively.

A suppression pipe is disposed to fit onto the pin on an inner circumferential side of the boss pipe, and a grease passage having an annular cross section and extending in an axial direction is defined between an inner circumferential surface of the suppression pipe and an outer circumferential surface of the pin. A gap between each end of the suppression pipe and each end of the boss pipe is closed with an annular lid plate, and hereby, a pair of right and left grease chambers communicating with the grease passage are defined.

Internal threads extend through an outer circumferential surface of the boss pipe to correspond to the respective grease chambers. A nipple is screwed into one of the internal threads, and the other internal thread is closed with a bolt. A grease supply operation from the nipple is performed while avoiding obstacles such as buckets, and hence, the nipple is mounted onto a side selected for ease of operation. Then, one grease chamber is filled with grease supplied from the nipple. Afterward, the other grease chamber is filled with the grease supplied through the grease passage, and the grease is caught in the chamber. Then, the grease intrudes into a small clearance between the pin and the bush to exert lubricating effect due to rise in pressure of the grease.

PRIOR ART DOCUMENT

Patent Document

Patent Document 1: Japanese Utility Model Registration No. 2530006

SUMMARY OF THE INVENTION

Problems to be Solved by the Invention

In a bearing structure of a construction machine described in Patent Document 1, however, there is room for improvement in two respects as follows.

As a first defect, an amount of grease to be supplied increases due to a volume of a grease chamber. That is, a lid plate may be disposed away from an inner surface of each boss part in an axial direction of a pin, to such an extent that at least a nipple or a bolt can be mounted. Consequently, increase in volume of each grease chamber causes increase in amount of the grease to be supplied.

As a second defect, grease supply to respective bushes is uneven due to a structure where the nipple is provided in one grease chamber. That is, only after the one grease chamber is filled with the grease supplied from the nipple, the grease supply to the other grease chamber through a grease passage is started. As a result, the grease supply to right and left bushes is noticeably uneven. The grease might be excessively supplied to the bush on one side that is provided with the nipple, and grease supply to the bush on the other side might run short.

The present invention has been developed to solve such problems, and an object thereof is to provide a construction machine in which an amount of grease to be supplied can decrease, and the grease can be supplied evenly to respective bushes.

Means for Solving the Problems

In order to achieve the above object, an aspect of the present invention is directed to a construction machine in which a pair of boss parts coupled via a boss pipe are fixed to an end portion of a first structural body, a coupling pin is rotatably supported in bushes provided in the respective boss parts, and brackets of a second structural body are coupled to opposite ends of the coupling pin protruding from outer surfaces of the respective boss parts, respectively, the construction machine including an inner pipe fitted onto the coupling pin on an inner circumferential side of the boss pipe, having opposite ends facing inner ends of the respective bushes, respectively, and defining, between the inner pipe and an outer circumferential surface of the coupling pin, a grease passage having an annular cross section and extending in an axial direction, a pair of side plates each forming an annular shape to close a gap formed between an end portion of the inner pipe and an end portion of the boss pipe, and defining, between each side plate and an inner surface of each boss part, each of grease chambers communicating with each other via the grease passage, and a grease supply pipe disposed between both the side plates, and having a base end welded to an outer circumferential surface of the inner pipe, an interior communicating with the grease passage, and a tip end exposed to an exterior via a hole extending through the boss pipe.

Advantageous Effects of the Invention

According to a construction machine of the present invention, an amount of grease to be supplied can decrease, and the grease can be supplied evenly to respective bushes.

MODE FOR CARRYING OUT THE INVENTION

Hereinafter, an embodiment of the present invention embodied in a hydraulic excavator will be described.

Figure 1:
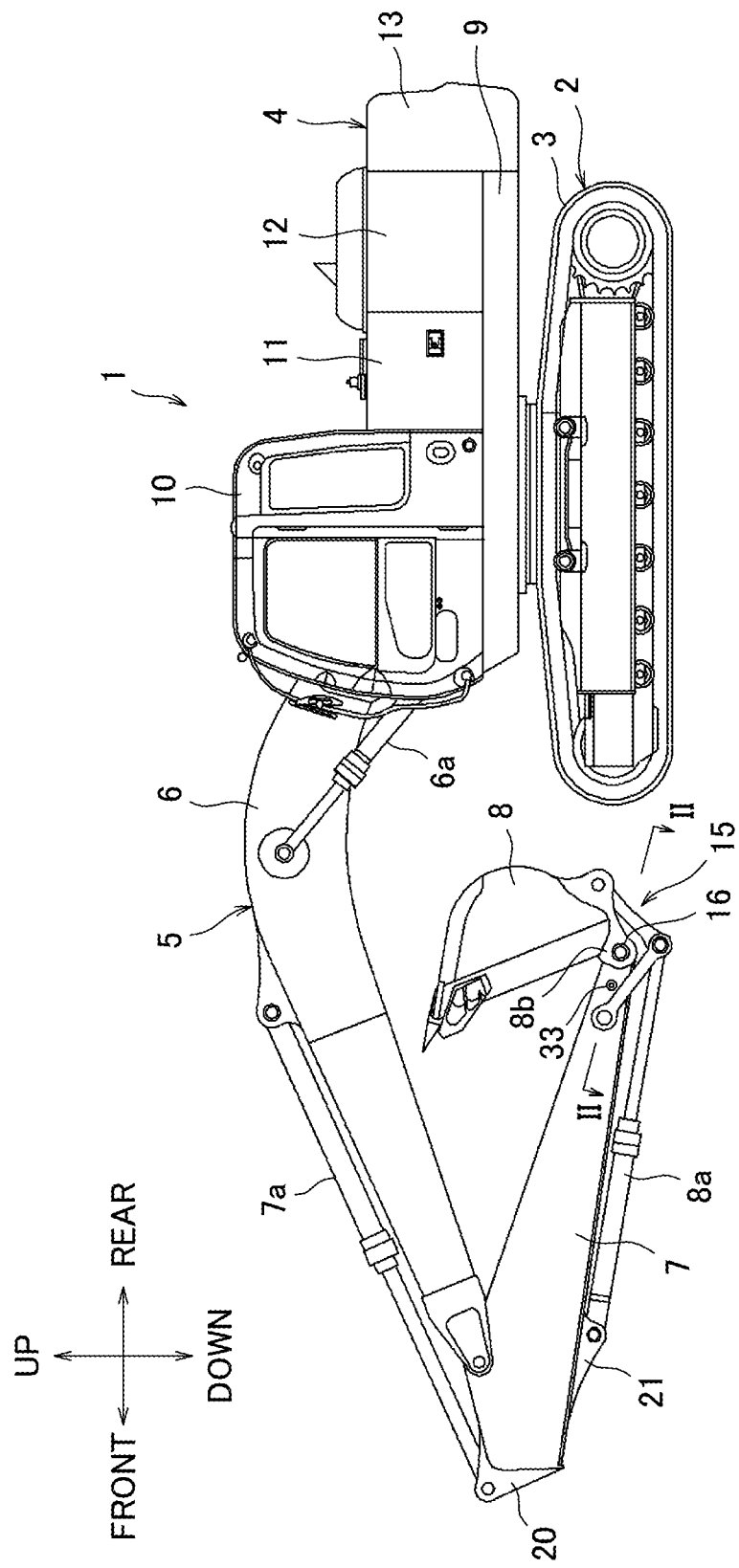
FIG. 1 is a side view showing a hydraulic excavator of an embodiment.

FIG. 1 is a side view showing the hydraulic excavator of the present embodiment. First, a schematic configuration of the hydraulic excavator will be described with reference to the drawing. Note that in the following description, front-rear, right-left and up-down directions are represented based on a position of an operator on board the hydraulic excavator.

A lower running body 2 of a hydraulic excavator 1 is provided with a crawler 3, and the crawler 3 is driven by an unshown running hydraulic motor to run the hydraulic excavator 1. An upper revolving body 4 is disposed on the lower running body 2, and the upper revolving body 4 is driven by an unshown revolving hydraulic motor to revolve. An articulated work front 5 is disposed in front of the upper revolving body 4, and the work front 5 includes a boom 6, an arm 7, and a bucket 8. The boom 6 has an angle to be changed with a boom cylinder 6a, the arm 7 has an angle to be changed with an arm cylinder 7a, and the bucket 8 has an angle to be changed with a bucket cylinder 8a.

An operator room 10 where the operator is on board is provided on a frame 9 in front of the upper revolving body 4, and a fuel tank 11, a machine room 12, a counterweight 13 and others are provided behind the operator room 10 on the frame 9. Although not shown in the drawing, a hydraulic pump to be driven by an engine is mounted in the machine room 12, and hydraulic oil is distributed with the hydraulic pump through a hydraulic piping to the above running and revolving hydraulic motors and the respective cylinders 6a to 8a of the work front 5, to operate such hydraulic equipment.

A tip end of the arm 7 and brackets 8b of the bucket 8 are coupled via a bearing structure 15, and the bucket 8 is rotatable about a coupling pin 16 of the bearing structure 15 relative to the arm 7. Hereinafter, the bearing structure 15 will be described in detail.

Figure 2:
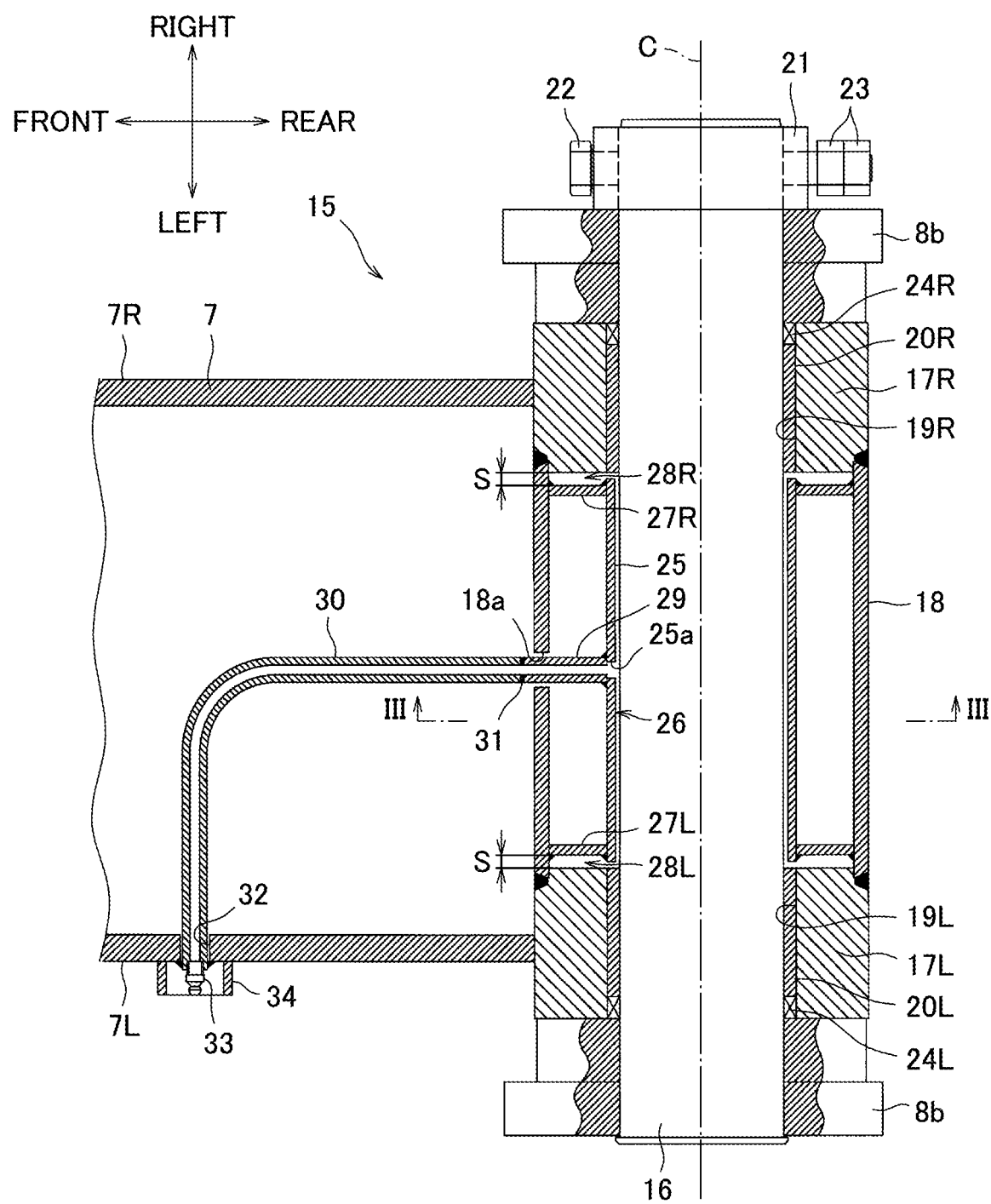
FIG. 2 is a cross-sectional view taken along the II-II line of FIG. 1 and showing a bearing structure coupling an arm and a bucket in a work front.

FIG. 2 is a cross-sectional view taken along the II-II line of FIG. 1 and showing the bearing structure 15 coupling the arm 7 and the bucket 8 in the work front 5.

The whole arm 7 has an elongated box shape formed by welding an upper plate, a lower plate, a left side plate and a right side plate to one another. FIG. 2 shows tip end parts of a left side plate 7L and a right side plate 7R of the arm 7. A pair of boss parts 17L, 17R are arranged to correspond to tip ends of the left and right side plates 7L, 7R, and each boss part 17L, 17R has a cylindrical shape centered on an axis C (corresponding to an axis center of the coupling pin 16) extending in the right-left direction. The respective boss parts 17L, 17R are welded to the corresponding left and right side plates 7L, 7R, and are coupled to each other via a boss pipe 18 disposed between the plates and having about the same outer diameter. Support holes 19L, 19R centered on the axis C extend through the boss parts 17L, 17R, and bushes 20L, 20R are inserted, under pressure, into the respective support holes 19L, 19R and sealed with seals 24L, 24R, respectively.

The coupling pin 16 is inserted into the boss pipe 18, and supported rotatably by the left and right bushes 20L, 20R. Opposite ends of the coupling pin 16 protrude left and right from outer surfaces of the boss parts 17L, 17R, and are coupled to the brackets 8b of the bucket 8, respectively. A bracket boss 21 is welded to the right bracket 8b of the bucket 8, and a bolt 22 extends through the bracket boss 21 and the coupling pin 16 and is fixed with double nuts 23, so that the coupling pin 16 is retained.

The bucket 8 is rotatably coupled to the tip end of the arm 7 via the bearing structure 15 including the above configuration. In the present embodiment, the arm 7 corresponds to a first structural body, and the bucket 8 corresponds to a second structural body.

An inner pipe 25 is disposed to fit onto the coupling pin 16 on an inner circumferential side of the boss pipe 18, and the inner pipe 25 has opposite ends being slightly away from and facing inner ends of the respective bushes 20L, 20R. An outer circumferential surface of the coupling pin 16 is slightly away from an inner circumferential surface of the inner pipe 25, so that a grease passage 26 having an annular cross section and extending in an axis C direction is defined between both the members 16 and 25.

Side plates 27L, 27R forming an annular shape to face inner surfaces of the respective boss parts 17L, 17R are arranged on the inner circumferential side of the boss pipe 18. Respective outer circumferences of the respective side plates 27L, 27R are welded to an inner circumferential surface of the boss pipe 18, and respective inner circumferences of the respective side plates 27L, 27R are welded to an outer circumferential surface of the inner pipe 25. Consequently, a gap formed between a left end of the inner pipe 25 and a left end of the boss pipe 18 and a gap formed between a right end of the inner pipe 25 and a right end of the boss pipe 18 are closed with the side plates 27L, 27R, respectively. Furthermore, each of grease chambers 28L, 28R communicating with each other via the grease passage 26 is defined between each side plate 27L, 27R and the inner surface of the boss part 17L, 17R.

In the outer circumferential surface of the inner pipe 25, a grease hole 25a extends through a position corresponding to a center between both the side plates 27L and 27R in the axis C direction, and a first grease supply pipe 29 (corresponding to a grease supply pipe of the present invention) is disposed to correspond to the grease hole 25a. The first grease supply pipe 29 has a base end welded to the outer circumferential surface of the inner pipe 25, and an interior communicating with the grease passage 26 via the grease hole 25a. The first grease supply pipe 29 has a tip end oriented to an outer circumferential side, and exposed to an exterior of the boss pipe 18 (corresponding to an exterior of the present invention), that is, to an interior of the arm 7 via a free fitting hole 18a (corresponding to a hole of the present invention) extending through the boss pipe 18.

In the arm 7, a base end of a second grease supply pipe 30 is welded (shown as a welded portion 31 in FIG. 2) to a tip end of the first grease supply pipe 29, and the second grease supply pipe 30 is formed to extend toward a base end of the arm 7 and bend at right angles to the left. A tip end of the second grease supply pipe 30 is inserted into a through hole 32 of the left side plate 7L of the arm 7 and welded, and a nipple 33 is mounted to an opening of the second grease supply pipe 30 on the left side plate 7L. Note that numeral 34 denotes a guard that protects the nipple 33.

Then, if the grease is supplied from the nipple 33, the grease is guided from the second grease supply pipe 30 through the first grease supply pipe 29 to the grease passage 26, and an interior of the grease passage 26 is filled with the grease that is guided to the left and right grease chambers 28L, 28R. If the left and right grease chambers 28L, 28R are filled with the grease that is caught in the chambers, the grease intrudes into a small clearance between the coupling pin 16 and the bush 20L, 20R to exert lubricating effect due to rise in pressure of the grease.

As described above, in the bearing structure 15 of the present embodiment, the grease is supplied through the first grease supply pipe 29 welded to the outer circumferential surface of the inner pipe 25 regardless of the left and right grease chambers 28L, 28R. This obviates need for arranging inner surfaces of respective boss parts 20, 21 away from a lid plate 24 to mount a nipple 30 or a bolt as shown in FIG. 1 of Patent Document 1, and as shown by a space S in FIG. 2, the side plate 27L, 27R can be disposed close to the inner surface of each boss part 17L, 17R. Therefore, a volume of the grease chamber 28L, 28R can be more significantly reduced than a volume of a grease chamber 29 of Patent Document 1, and a total amount of the grease to be supplied can be noticeably decreased even if an inner volume of the grease supply pipe 29, 30 is taken into consideration.

Furthermore, since the first grease supply pipe 29 is disposed at the position corresponding to the center between both the side plates 27L and 27R in the axis C direction, the grease from the first grease supply pipe 29 branches in the right-left direction at a central position of the grease passage 26 in the axis C direction. Then, the branched grease reaches the left and right grease chambers 28L, 28R through the grease passage 26 at almost equal timing, and the respective grease chambers 28L, 28R are filled in parallel. As a result, after the grease chambers 28L, 28R are filled, the grease is evenly supplied to the left and right bushes 20L, 20R, and unlike Patent Document 1, excess or shortage of the amount of the grease to be supplied due to uneven grease supply can be previously prevented.

On the other hand, in the present embodiment, for making it possible to assemble the bearing structure 15 by welding, dimensions of respective parts are set as follows.

Figure 3:
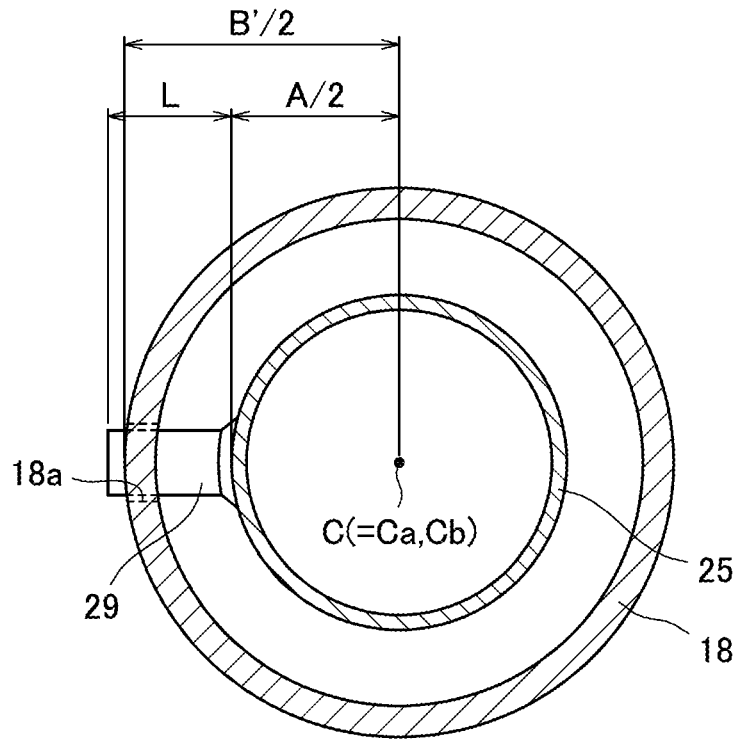
FIG. 3 is a cross-sectional view taken along the III-III line of FIG. 2 and showing a relation between an inner pipe and a boss pipe.
Figure 4:
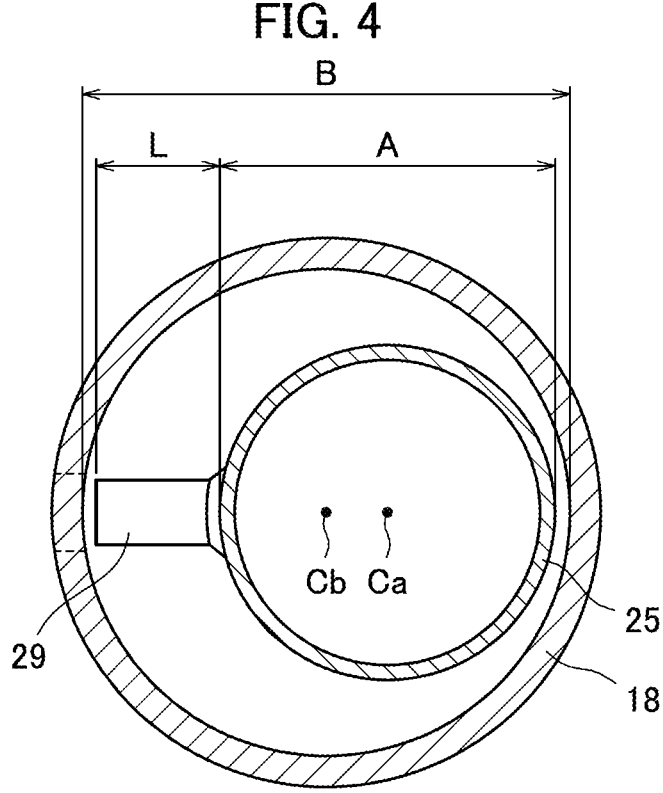
FIG. 4 is a cross-sectional view corresponding to FIG. 3 when inserting and disposing the inner pipe into the boss pipe.

FIG. 3 is a cross-sectional view taken along the III-III line of FIG. 2 and showing a relation between the inner pipe 25 and the boss pipe 18, and FIG. 4 is a cross-sectional view corresponding to FIG. 3 when inserting and disposing the inner pipe 25 into the boss pipe 18.

In the present embodiment, dimensions of the respective members 25, 18, 29 are set to satisfy conditions of $A+L<B$ and to satisfy conditions of $A/2+L \geq B'/2$, in which A is an outer diameter of the inner pipe 25, B is an inner diameter of the boss pipe 18, B' is an outer diameter of the boss pipe 18, and L is a length of protrusion of the first grease supply pipe 29 from the outer circumferential surface of the inner pipe 25.

A procedure of assembling the bearing structure 15 is described. First, the first grease supply pipe 29 is welded to the inner pipe 25, and the inner pipe 25 is inserted and disposed into the boss pipe 18 as shown in FIG. 4. An inserting operation at this time is performed with a positional relation in which an axis Ca of the inner pipe 25 is shifted from an axis Cb of the boss pipe 18 to a side opposite to the first grease supply pipe 29. The first grease supply pipe 29 protrudes from the outer circumferential surface of the inner pipe 25, but the conditions of $A+L<B$ are satisfied. Therefore, interference of the tip end of the first grease supply pipe 29 with the inner circumferential surface of the boss pipe 18 can be prevented, and the inner pipe 25 can be inserted and disposed into the boss pipe 18 without any problems.

Next, as shown in FIG. 3, the boss pipe 18 and the inner pipe 25 are arranged to have a regular positional relation, that is, a positional relation in which the free fitting hole 18a on a boss pipe 18 side corresponds to the first grease supply pipe 29 on an inner pipe 25 side and the axes Cb, Ca coincide with each other. Then, the side plates 27L, 27R are arranged on the left and right, the outer circumferences of the respective side plates 27L, 27R are welded to the inner circumferential surface of the boss pipe 18, and the inner circumferences of the respective side plates 27L, 27R are welded to the outer circumferential surface of the inner pipe 25. The left and right gaps formed between the inner pipe 25 and the boss pipe 18 are closed with the side plates 27L, 27R, respectively, and the boss pipe 18 is bonded to the inner pipe 25 via the left and right side plates 27L, 27R.

Afterward, the boss parts 17L, 17R are welded to the opposite ends of the boss pipe 18, members such as the bushes 20L, 20R and the coupling pin 16 are assembled, and the base end of the second grease supply pipe 30 is welded to the tip end of the first grease supply pipe 29 that is exposed from the free fitting hole 18a of the boss pipe 18. Since the conditions of $A/2+L \geq B'/2$ are satisfied, as shown in FIG. 3, the tip end of the first grease supply pipe 29 is flush with or slightly protrudes from an opening of the free fitting hole 18a of the boss pipe 18, and the base end of the second grease supply pipe 30 can be welded to the tip end without any problems.

Then, the second grease supply pipe 30 is inserted and disposed from the tip end of the arm 7 welded in the box shape, and the tip end of the pipe is inserted into the through hole 32 of the left side plate 7L. The respective boss parts 17L, 17R are welded to the left and right side plates 7L, 7R of the arm 7 in this state, the tip end of the second grease supply pipe 30 is welded to the through hole 32 of the left side plate 7L and the nipple 33 is mounted, to complete the assembling operation.

The embodiment has been described above, and an aspect of the present invention is not limited to this embodiment. For example, in the above embodiment, the invention is embodied as the bearing structure 15 that rotatably couples the bucket 8 to the tip end of the arm 7 of the work front 5 of the hydraulic excavator 1, but a structure to which the invention is applied is not limited to this structure. For example, the invention may be embodied as a bearing structure where the base end of the arm 7 is rotatably coupled to a tip end of the boom 6, or embodied as a bearing structure of a working device provided in a construction machine other than the hydraulic excavator 1.

Figure 5:
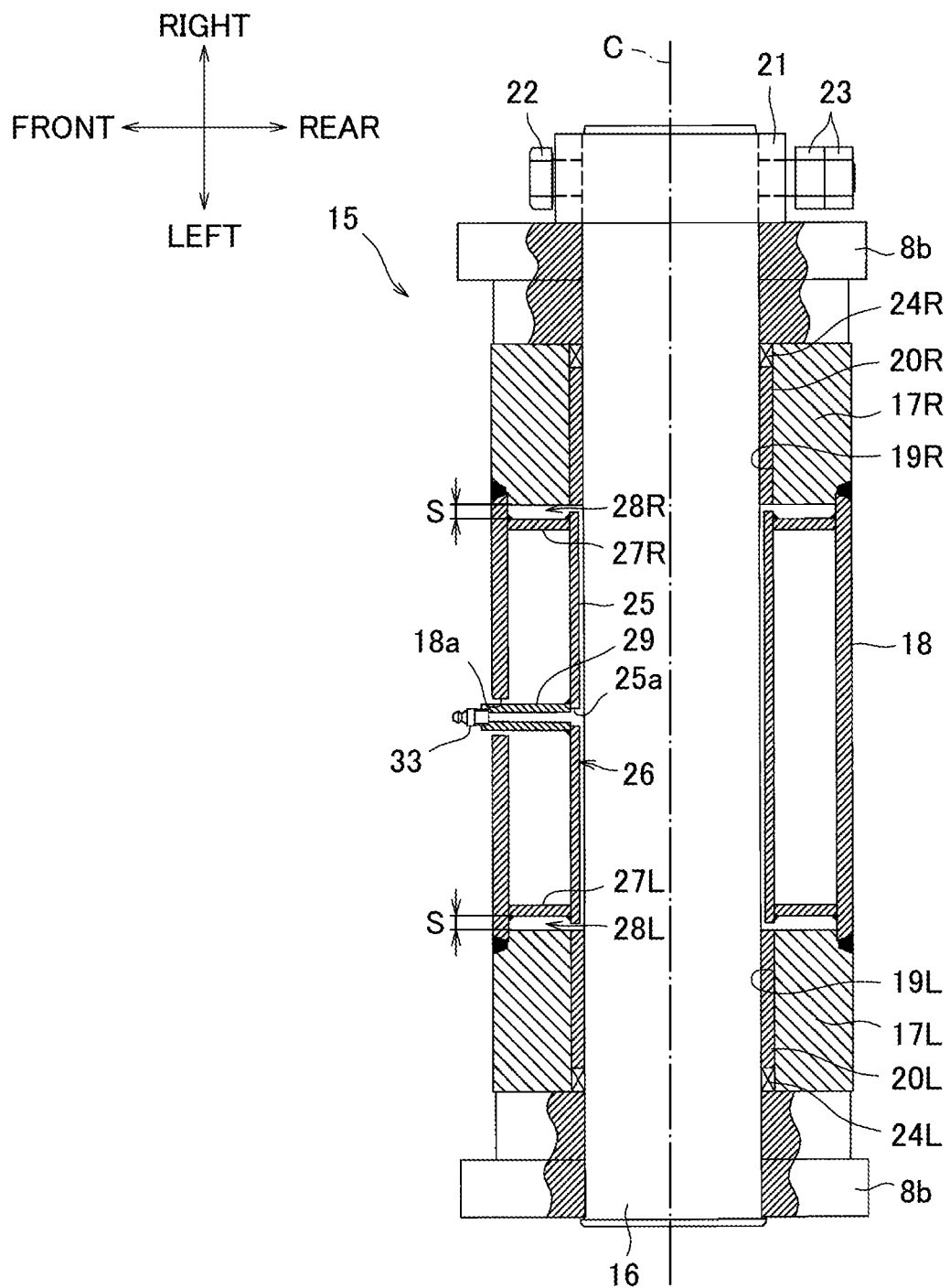
FIG. 5 is a cross-sectional view corresponding to FIG. 2 and showing another example where a nipple is mounted to a tip end of a first grease supply pipe.

Further, in the above embodiment, the tip end of the first grease supply pipe 29 is exposed to the interior of the arm 7, and the nipple 33 for supplying the grease is disposed on the left side plate 7L of the arm 7 via the second grease supply pipe 30. Alternatively, for example, as shown in FIG. 5, the nipple 33 may be mounted to the tip end of the first grease supply pipe 29. Needless to say, in this case, for making it possible to supply the grease from the nipple 33, the tip end of the first grease supply pipe 29 is not exposed to the interior of the arm 7 but is exposed to an exterior of the arm 7, and the nipple 33 is mounted to the tip end. As compared with the embodiment, the amount of the grease to be supplied can be further decreased by the inner volume of the second grease supply pipe 30. Note that in this case, the first grease supply pipe 29 may be welded to the free fitting hole 18a of the boss pipe 18, to prevent inward intrusion of muddy water or the like.

Also, in the above embodiment, the base end of the first grease supply pipe 29 is welded to the center of the outer circumferential surface of the inner pipe 25 in the axis C direction, but the first grease supply pipe 29 may be disposed at any position between the left side plate 27L and the right side plate 27R. In this case, the timing at which the grease reaches the left and right grease chambers 28L, 28R through the grease passage 26 is little back and forth, but this example is similar to the embodiment in that the respective grease chambers 28L, 28R are filled in parallel. Therefore, the embodiment is fundamentally different from Patent Document 1 where only after one grease chamber 29 is filled with the grease, the grease supply to the other grease chamber 29 is started. Consequently, the grease can be more evenly supplied to the left and right bushes 20L, 20R.

EXPLANATION OF REFERENCE SIGNS

1 hydraulic excavator (a construction machine)
7 arm (a first structural body)
8 bucket (a second structural body)
8b bracket
16 coupling pin
17L, 17R boss part
18 boss pipe
18a free fitting hole (a hole)
20L, 20R bush
25 inner pipe
26 grease passage
27L, 27R side plate
28L, 28R grease chamber
29 first grease supply pipe (a grease supply pipe)

The invention claimed is:

1. A construction machine in which a pair of boss parts coupled via a boss pipe axially extending therebetween are fixed to an end portion of a first structural body, a coupling pin coaxially extends through the boss pipe and is rotatably supported in bushes provided in aligned apertures in the respective boss parts, and a pair of brackets of a second structural body are coupled to opposite ends of the coupling pin protruding from outer surfaces of the respective boss parts, respectively, the construction machine comprising:

an inner pipe coaxially fitted onto the coupling pin on an inner circumferential side of the boss pipe, having opposite axial ends facing inner ends of the respective bushes, respectively, and defining, between the inner pipe and an outer circumferential surface of the coupling pin, a grease passage having an annular cross section and extending in an axial direction, a pair of side plates each forming an annular shape to face inner surfaces of the respective boss parts, respective outer circumferences of the respective side plates being welded to an inner circumferential surface of the boss pipe and respective inner circumferences of the respective side plates being welded to an outer circumferential surface of the inner pipe to close a gap formed between a respective axial end portion of the inner pipe and a respective axial end portion of the boss pipe, and defining, between each side plate and an inner surface of each respective boss part, one of a pair of grease chambers communicating with each other via the grease passage, and a grease supply pipe disposed between both the side plates, and having a base end welded to an outer circumferential surface of the inner pipe, an interior communicating with the grease passage, and a tip end exposed to an exterior via a hole extending through the boss pipe.

2. The construction machine according to claim 1, wherein conditions of $A+L<B$ are satisfied, in which A is an outer diameter of the inner pipe, B is an inner diameter of the boss pipe, and L is a length of protrusion of the grease supply pipe from the outer circumferential surface of the inner pipe.

3. The construction machine according to claim 2, wherein conditions of $A/2+L \geq B'/2$ are satisfied together with the conditions of $A+L<B$, in which B' is an outer diameter of the boss pipe.

* * * * *